US007631207B1

(12) United States Patent
Song et al.

(10) Patent No.: US 7,631,207 B1
(45) Date of Patent: Dec. 8, 2009

(54) REDUCING POWER CONSUMPTION FOR PROCESSING OF COMMON VALUES IN MICROPROCESSOR REGISTERS AND EXECUTION UNITS

(75) Inventors: Seungyoon Peter Song, Santa Clara, CA (US); Jorel Hartman, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 711 days.

(21) Appl. No.: 11/408,784

(22) Filed: Apr. 21, 2006

(51) Int. Cl.
*G06F 1/00* (2006.01)
*G06F 1/32* (2006.01)
(52) U.S. Cl. ............... 713/320; 713/300; 713/323; 713/324; 713/330; 711/171; 711/172
(58) Field of Classification Search ........... 713/320, 713/300, 323, 324, 330; 711/171, 172
See application file for complete search history.

(56) References Cited

U.S. PATENT DOCUMENTS

| | | | | |
|---|---|---|---|---|
| 7,035,965 B2* | 4/2006 | Zitlaw | ........... | 711/103 |
| 7,243,204 B2* | 7/2007 | Citron | ........... | 711/171 |
| 2003/0036259 A1* | 2/2003 | Tate et al. | ........... | 438/622 |
| 2003/0126458 A1* | 7/2003 | Teramoto et al. | ........... | 713/194 |
| 2006/0064561 A1* | 3/2006 | Simeral et al. | ........... | 711/168 |
| 2007/0230606 A1* | 10/2007 | Anders et al. | ........... | 375/262 |

OTHER PUBLICATIONS

Jun Yang et al., "Frequent Value Encoding for Low Power Data Buses", ACM Transactions on Design Automation of Electronic System, vol. 9, No. 3, Jul. 2004, pp. 354-384.
Saisanthosh Balakrishnan et al., "Exploiting Value Locality in Physical Register Files", Computer Sciences Department, University of Wisconcin-Madison, sai, sohi@cs.wisc.edu (12 pgs).

\* cited by examiner

*Primary Examiner*—Thomas Lee
*Assistant Examiner*—Michael J Brown
(74) *Attorney, Agent, or Firm*—Osha • Liang LLP

(57) ABSTRACT

Reducing power consumption in microprocessors for the processing of common values. Common values provided in at least one received operation are encoded into encoded common values having a lower number of bits than the common values prior to encoding. In one aspect, a separate encoding bus is used to provide the encoded common values in various processing of additional received operations in the microprocessor instead of a full-bit bus of the microprocessor, the encoding bus having less bits than the full-bit bus. In another aspect, a result of the operation is predicted based on at least one encoded common value and execution of the operation is bypassed.

28 Claims, 2 Drawing Sheets

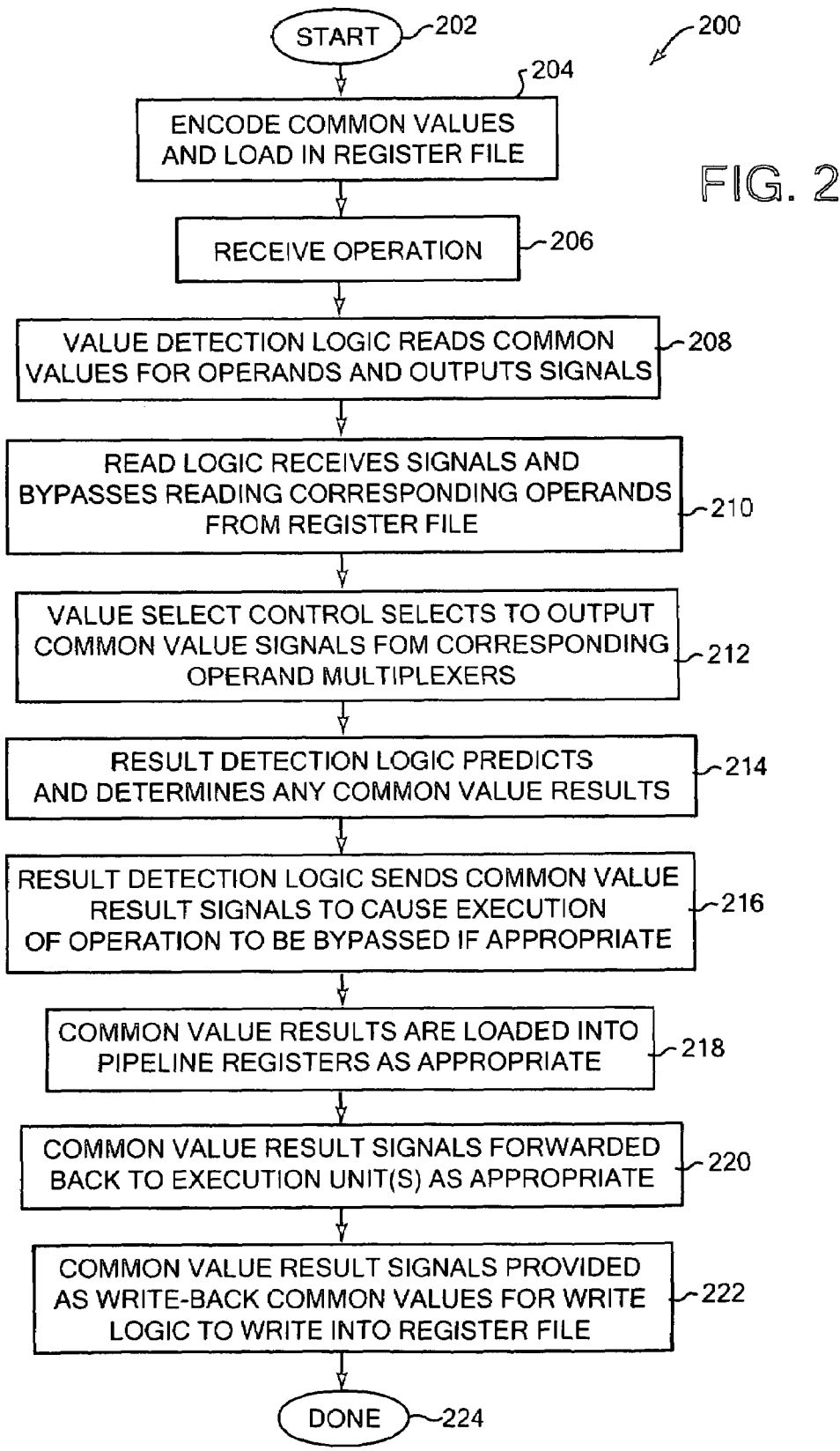

REDUCING POWER CONSUMPTION FOR PROCESSING OF COMMON VALUES IN MICROPROCESSOR REGISTERS AND EXECUTION UNITS

FIELD OF THE INVENTION

The present invention relates to microprocessors, and more particularly to power consumption during processing of commonly occurring values in microprocessors.

BACKGROUND OF THE INVENTION

Microprocessors are used extensively in computer and electronic devices to process values and data. Values are often loaded in storage registers of the microprocessor to allow faster reading and writing of the values during processing such as execution of operations.

Some values are much more common in microprocessor operations. For example, zero is the most frequently occurring value in almost all computations performed by computers, including microprocessors. Not only does a zero value often result from computations, a zero value is often used to indicate or generate a negative result for comparisons or other operations. Other values are also usually quite common in microprocessor computations. For example, values such as one (1) (or negative one (−1)) are often used for incrementing or decrementing counters, for multipliers, or for other kinds of processing.

Most microprocessor architectures provide a few instructions to produce the value of zero in a register. Examples include moving a constant of zero into a register, or XORing a register with itself. Most microprocessors, however, do not take advantage of the commonality and high frequency of values such as zero and one to reduce power consumption when accessing the register and transmitting these kinds of values. For example, most microprocessors do not care whether a register holds, or is to hold, a common value such as zero. These microprocessors thus must consume power over all the bits of their main data buses in frequent reads and writes of common values from and to registers of a register file in the microprocessor. In addition, microprocessors ignore common values when performing a computation to produce a result from an operation involving a common value. For example, most microprocessors compute a common value result that could have been predicted, for example, in operations such as multiplying with zero. Since these kinds of common values and results frequently occur, significant power is unnecessarily consumed by the microprocessor in repetitive operations and transmissions involving these values.

Accordingly, what is needed is a method and system that provides reduced power consumption for operations of a microprocessor involving frequently occurring, common values. The present invention addresses such a need.

SUMMARY OF THE INVENTION

The invention of the present application relates to reducing power consumption in microprocessors during processing related to common values. In one aspect of the invention, a method for reducing power consumption in a microprocessor includes encoding common values provided in at least one received operation into encoded common values having a lower number of bits than the common values prior to encoding. An encoding bus is used to provide the encoded common values in processing of additional received operations in the microprocessor instead of a full-bit bus of the microprocessor, where the encoding bus is separate from and has less bits than the full-bit bus, thereby reducing the power consumption of the microprocessor.

In another aspect of the invention, a microprocessor includes a common value detection logic that determines whether an encoded common value is stored in a register file for an operand of an operation to be performed by the microprocessor, the encoded common value having a lower amount of bits than full-bit values stored in registers of the register file. Read logic is coupled to the common value detection logic and receives a signal from the common value detection logic indicating the encoded common value. The signal indicates to the read logic to bypass reading a register in the register file that corresponds to the common value, thereby reducing power consumption of the microprocessor.

In another aspect of the invention, a method for reducing power consumption in a microprocessor includes encoding common values provided in at least one received operation into encoded common values having a lower number of bits than the common values prior to encoding. The encoded common values are used in processing of additional received operations in the microprocessor, including predicting a result of the operation based on at least one encoded common value and bypassing execution of the operation, thereby reducing the power consumption of the microprocessor.

In another aspect of the invention, a microprocessor includes result detection logic that receives an operation to be performed by the microprocessor and receives a signal providing an encoded common value as an operand of the operation, the signal having a lower amount of bits than full-bit buses used for transmitting values in the microprocessor. The result detection logic determines whether it can predict a result of the operation based on the encoded common value, and outputs a common value result signal indicating the result. At least one execution unit is coupled to the result detection logic and is operative to receive the common value result signal and to bypass execution of the operation based on the common value result signal, thereby allowing a reduction in the consumption of power by the microprocessor.

The present invention provides a method and system allowing the reduction of power consumption during the processing of values in a microprocessor. The invention provides several microarchitecture features that minimize accessing common values in registers and transmitting common values on buses, and also minimize unnecessary execution of operations involving common values, leading to significant reductions in power consumption of the microprocessor.

BRIEF DESCRIPTION OF THE FIGURES

FIG. 2 is a flow diagram illustrating a method of the present invention for reducing the power consumption of a microprocessor.

DETAILED DESCRIPTION

Figure 1:
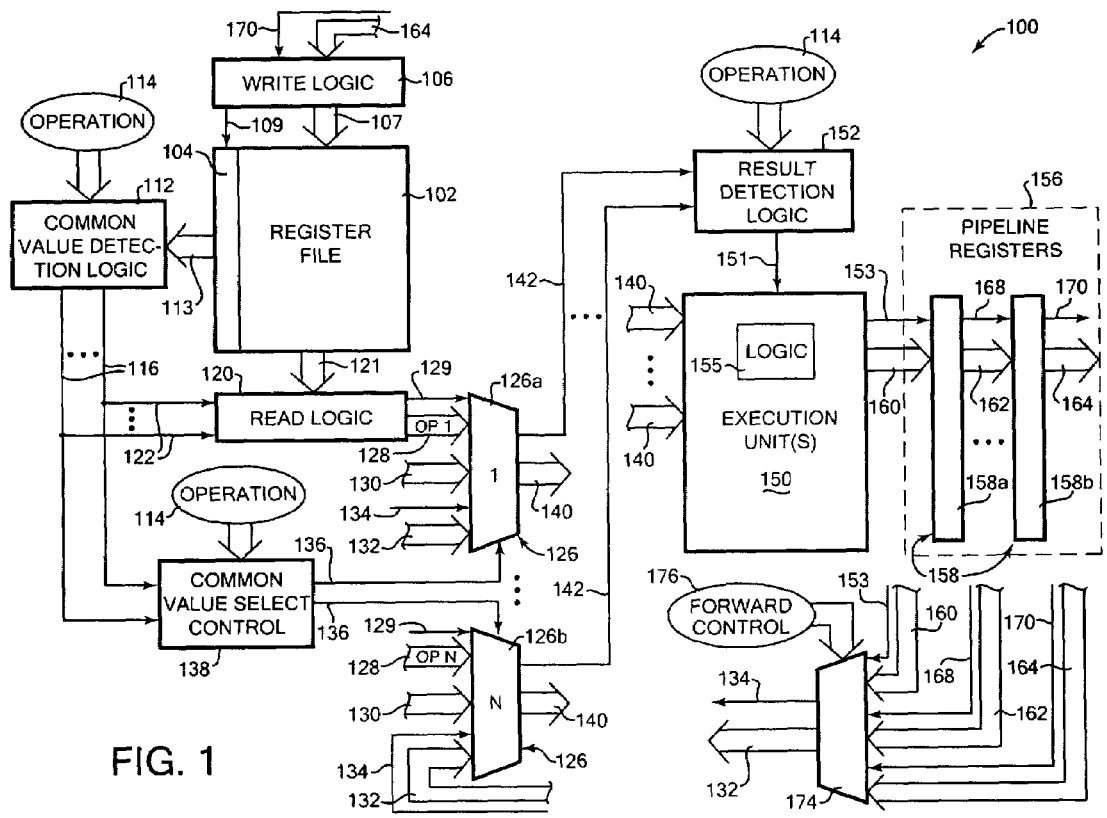
FIG. 1 is a block diagram illustrating a microprocessor architecture including the power reduction features of the present invention.

The present invention relates to microprocessors, and more particularly to power consumption during processing of values in microprocessors. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 and 2 in conjunction with the discussion below.

FIG. 1 is a block diagram illustrating a microprocessor architecture 100 of the present invention allowing reduced power consumption for the processing of common values by a microprocessor.

The microprocessor is typically included in a computer system or electronic device. For example, the microprocessor can be in a mainframe computer, desktop computer, workstation, portable computer, or electronic device. The microprocessors can interface with memory devices and other components to control the operation of the device, including performing data manipulation, computation, input/output, and other typical functions.

An effective way to reduce power consumption of a microprocessor is to minimize the power necessary to handle frequently occurring values, such as zero, which is typically the most frequent, and one, typically the next most frequent. A reduction in power consumption of a microprocessor can be achieved by minimizing the power necessary to process frequently-occurring values.

The present invention reduces power consumption of a microprocessor by encoding common values into a smaller number of bits than used on the full main bus of the microprocessor, thus facilitating the low-power accessing and storing of those values, and by avoiding the power-consuming full execution of operations involving common values. The term "common value" herein refers to a frequently-occurring value in typical computations and processing of the microprocessor. Typically, the most common such value is zero. Another typical common value is one (1) (or negative one (−1)), which (numerically) are often used in incrementing or decrementing counters or indicators. Other common values may also be encoded in other embodiments, e.g., a value that occurs frequently in a particular microprocessor architecture. Furthermore, a common value in one part of a value may indicate what the other part of the value is; e.g., if a mantissa part of a floating point value is zero, then the exponent part of the floating point value is irrelevant and can be ignored, and such considerations can be used for the common value storage and processing of the present invention. In addition, herein the term "processing" can refer to computation and execution of operations on values, as well as writing and reading of values to and from storage, such as registers. Furthermore, the term "full-bit" or "full" herein refers to the full amount of bits typically used in the microprocessor to store and transmit values; for example, many current microprocessor architectures use full-bit buses and storage locations having 32 or 64 bits for normal integer instructions (and may be a different full-bit value for floating point and other types of numbers and instructions).

The embodiment described below is an example embodiment that can encode common values and determine results for operations involving common values used by the microprocessor. The embodiment described herein is used to encode one type of common value, such as zero, and thus one-bit signals and flip-flops (or other storage mechanisms) can be used to encode these values, including transmitting and storing these values. Similarly, other common values, such as one, can alternately be detected and/or predicted in the described embodiment using the one-bit (or other low-numbered bit) signals and storage mechanisms. In other embodiments, multiple types of common values, such as zero and one, etc., can be encoded in the architecture according to the present invention. This can be implemented in several ways; for example, each common value can be encoded into its own one-bit signal and storage. Alternatively, all the common values used can be encoded into fewer bits; for example, if eight different common values are used, these values can be encoded into three bits in a binary fashion. It should be noted that there is a performance curve related to how many bits are used to represent several common values; i.e., there is a point where common values are encoded onto so many bits that not enough power is saved to make the encoding worthwhile in comparison to using the full bus of the microprocessor.

Architecture 100 includes register portion that stores values in registers for use in microprocessor processing. A register file 102 includes storage locations for holding values used in and resulting from operations of the microprocessor. Typical current microprocessor implementations store 32-bit or 64-bit values in the register file 102.

Register file 102 includes a common value storage area 104 of the present invention. Each common value in the storage area 104 is associated with a particular register in the register file 102, and indicates whether a common value (such as zero) has been written or not to the associated register. This allows the present invention to determine whether a common value is stored for a particular register/operand, and to retrieve the common value, without having to read the entire register for the operand, thus reducing power consumption of the microprocessor. For example, in the described embodiment, the storage area 104 includes a single bit for each of the registers in the register file, stored at the beginning of each register; this allows each common value indicator to be stored near its associated register value and retrieved quickly. In other embodiments, the storage area 104 can be implemented differently. For example, the first bits in the register file can be a reference to a look-up table stored elsewhere in the register file that holds the common values.

Write logic 106 is used to write values to the register file 102, including to the common value storage area 104. The values received by the write logic 106 are write-back results provided on a write-back bus 164; these results are values that resulted from previous processing by the microprocessor and are written to the register file to be used in further operations, for example; this is described in greater detail below. Write logic 106 also receives a common value signal 170 of the present invention, which is a signal again resulting from previous processing of the microprocessor, and indicating to the write logic whether to write a common value to the common value storage area 104. Write logic 106 loads full-bit values into registers via bus 107, and loads common values into the storage area 104 via line 109. For example, in an embodiment in which common values of zero are encoded according to the present invention, if the common value signal 170 has a predetermined logic level indicating a zero value, then the write logic 106 can write a one-bit zero value into the common value storage area 104 for the associated register of the register file (the write logic knows which associated register it is based on additional information received, e.g., information on the write back bus 164 or other bus or line not shown). The write logic has thus encoded a zero value into a one-bit value, rather than storing the zero as many bits in a register of the register file. A similar process can be used to encode other common values, such as one. The write logic 106 can encode common values and load them into the storage area 104, to be used in later operations (such as operation 114) when detected by common value detection logic 112.

Common value detection logic 112 of the present invention receives an operation 114 from other components in the microprocessor. The operation 114 is typically a decoded instruction that is to be performed and executed by the microprocessor. The operation includes a number N of operands, each operand being stored in a register in the register file 102 during previous operations (using the common value line 170 and write logic 106). For example, the operation 114 can be an expression such as, "r0+r1+r2," where r0, r1 and r2 refer to particular registers in the register file 102, such that the values stored in those registers are to be summed together.

The common value detection logic 112 retrieves the common values in the storage area 104 for the registers corresponding to operands used in the operation 114 and determines which of the values indicate a common value is present. For example, in one embodiment the logic 112 passes the retrieved common values onto appropriate particular lines of the output lines 116. The result of reading and passing of the values thus determines whether any of the values for the operands are common values for the components receiving the signals from lines 116 (described below). The common values are retrieved by the logic 112 from single locations in the register file 102, thus saving the power of a full read operation in the registers. Furthermore, the common values are retrieved over the appropriate one-bit lines 113, and thus an entire multi-line bus (such as a 32- or 64-bit bus) need not be powered. Any suitable implementation for the logic 112 can be used, e.g., the logic 112 can simply pass the values from storage area 104 to the output lines 116 as signals, or the logic 112 can include a comparator, XOR gate, or other comparing logic to determine whether the retrieved register values indicate a common value for the associated operand (e.g., if more than one type of common value is being detected and encoded).

The common value detection logic 112 has a number of output lines 116 equal to the number of maximum number of registers usable in the architecture 100. If the value detection logic 112 has detected a common value in the storage area 104 for an operand target (i.e., a register value), that common value is output (or indicated) in a signal provided on the line 116 corresponding to that register.

Read logic 120 reads values from registers in the register file 102 over bus 121. In a typical operation, the read logic 120 reads the values from the registers that are used for operands in the operation 114, and provides those operand values on a bus 128 to a multiplexer 126. There can be a separate read logic 120 for each operand, or in other embodiments the read logic for different operands can be combined into a single read logic 120. In the present invention, the read logic 120 also is connected to bypass read lines 122, which are connected to common value output lines 116 and thus carry the signals from the value detection logic 112. A different bypass read line 122 can be connected to each line 116, so that each common value operand in the operation 114 can be signaled to the read logic 120. If the read logic 120 receives a signal on a bypass line 122 that indicates a common value was stored in the storage area 104 for a particular operand, then the read logic 120 will not read the register value in register file 102 for that operand. This reduces the power consumed during operation processing, since the register did not have to be read and the read bus 121 did not have to be powered. For example, the bus 121, and other similar buses in the architecture 100, may be 32 bits, or 64 bits, wide. Instead of having to read 32 or 64 bits, the present invention allows a single-bit line 122 to be used: the common value bit from the storage area 104.

A number of multiplexers 126 are included in the architecture 100. There is preferably a different multiplexer 126 corresponding to each of the operands of the operation 114, where the number of multiplexers 126 equals the number of operands that the architecture 100 allows. For example, multiplexer 126a handles the first operand Op1 of the operation, and multiplexer 126b handles the Nth operand OpN. Each multiplexer 126 receives several inputs, including an operand input on bus 128 from the read logic 120, a common value input 129 associated with the bus 128, a common value constant 130, a forward result 132, and a forwarded common value 134 associated with the forward result 132. One of these inputs is selected to be provided as the output of the multiplexer 126. The output is selected based on the operand select signal 136 received from the common value select control 138 (described below). The common value constant 130 is a constant that indicates the common value (such as zero, if zero is the common value being used), and can be used when it is needed to output the desired common value on the full-bit bus 140 output from a multiplexer 126, e.g., to the execution unit(s) 150. The constant 130 can be implemented as any desired signal, e.g., a signal that preferably consumes little power, such as wires connected to ground or a voltage supply (and inverted if necessary to result in the desired common value).

Common value select control 138 of the present invention receives the operation 114 from other microprocessor components, similarly to common value detection logic 112, and also receives the common value lines 116 from the value detection logic 112. The common value select control 138 is connected to each multiplexer 126 by a different operand select line 136. Based on the signals on lines 116, the common value select control 138 can determine which operands of the operation 114 have common values stored in their registers of the register file 102. Using this information, the select control 138 determines which of the inputs of each multiplexer 126 should be provided as that multiplexer's output, and outputs the appropriate selection control signal on the appropriate operand select line(s) 136. Thus, for example, if the line 116 corresponding to the first operand indicates a common value for that operand, then the select control 138 can select for multiplexer 126a the common value line 129 from the read logic 120, or the common value constant 130 if the common value is to be output on full-bit bus 140. In other cases, forwarding control logic 176 indicates to the common value select control 138 that the forwarded common value resulting from a previous operation execution should be selected, based on forwarding conditions well known to those of skill in the art. In still other cases, if there is no forwarded result to select, and if the corresponding line 116 indicates a non-common value, then the select control 138 selects the full-bit operand input on bus 128, or if the forwarding logic indicates a full-bit result is forwarded, the forwarding result bus 132 is selected.

Each multiplexer has both an output operand bus 140 and an output common value line 142. If the full-bit operand is selected to be output by the operand select line 136 for a particular multiplexer 126, then that multiplexer 126 outputs the operand on operand bus 140. If, however, a common value line 129, 130, or 134 has been selected to be output, then that multiplexer outputs the common value as a signal on a single common value line 142, rather than on the bus 140. The common value line 142 is provided to the common value result detection logic, detailed below. Similarly to other stages of the architecture 100 of the present invention, the use of common value lines 142 allows significant power savings, since the several lines of the bus 140 do not need to be powered in the case of common value transmission.

The execution portion of the architecture 100 processes operations to obtain operation results, and includes execution unit(s) 150 and result detection logic 152. Execution unit 150 executes the operation 114 to determine a result by performing the operation on the operands of the operation. The execution unit 150 receives the non-common-value operands on buses 140 from the associated multiplexers 126.

In the present invention, the execution portion of the architecture also includes result detection logic 152. Logic 152 determines whether the microprocessor can save power during execution of the operation, by detecting or predicting the result based on any common value operands that are part of the operation. If the result can be predicted and determined, some or all of the execution of the operation can be bypassed, thereby allowing a reduction in the consumption of power by the microprocessor.

As shown in FIG. 1, the common value result detection logic 152 receives the operation 114, as well as the common value lines 142 from the multiplexers 126 which provide any common values that have been detected in any of the operands from the operation 114. The result detection logic 152 examines the operation 114 and any common value operands based on lines 142, and determines if it can predict the result of the operation based on those common value operands; if so, it determines that result. For example, if there is a multiply operation between two of the operands in operation 114, and at least one of those operands is determined to be a common value of zero based on lines 142, then the detection logic 152 can simply determine that the result of that operation will be zero without having to use the execution unit(s) 150. Similarly, a zero operand divided by any other value will be predicted to be zero. In an embodiment predicting results for a common value of one, the result detection logic 152 includes logic that similarly predicts the result, e.g., a multiply operation between any operand value and a one value will result in the operand value, or a divide operation including any operand value divided by one will result in the operand value. The logic can predict such a result without having to use the execution unit(s) 150. Such result detection logic can be implemented in a variety of ways; the implementation of functions needed by such logic is well known to those of skill in the art.

This simple predictability of common value operations allows the execution of the operation by the execution unit(s) 150 to be bypassed, thus saving the power that would have been used for that execution. The result predictability also can allow (e.g., in the case of zero common values) the result to be determined for an operation without having to forward some or all of the values on the buses 142 to the execution units(s) 150 for full processing, again saving power on the buses and in the execution unit. In contrast, in prior microprocessor architectures, the execution unit would always be provided all the operands via buses 140, and would always execute the operation, regardless of whether the operands were common values that provided a simply-predicted result. It should be noted that the logic used in result detection logic 152 is preferably simple, for simply-determined results as in the examples above, since there is a tradeoff between complexity and power usage. For example, if the power used by the result detection logic 152 in a complex operation is close to the power the execution unit(s) 150 would use if executing the operation, then there is little reason to have the logic 152 perform result prediction for that operation.

The result detection logic 152 outputs any determined common value results on line 151, which is a one-bit line, for example (if a single common value is being encoded). This common value result is input to the execution unit(s) 150. A common value indicated on line 151 instructs the execution unit(s) 150 to ignore the operation since the result detection logic 152 has indicated the result of that operation (the execution unit(s) knows which operand(s) are being referred to by other information provided on buses 140 or other signals (not shown) (buses 140 can also include signals which designate if the values on the buses are common values). Any other operands for which the result detection logic 152 has not provided a result are input to the execution unit(s) 150 via buses 140.

The execution unit does not need to perform the operation as indicated by the common value signal on line 151. For example, in a multiplication operation (or multiplication part of an operation) between a common value of zero and another value, the logic 152 sends the actual result, the zero value, on line 151. The execution unit(s) 150 can then simply send the zero result at one of its outputs, such as a power-saving common value line 153. If a common value of one is being used, then in a multiply operation, for example, the result signal 151 indicates to the execution unit(s) 150 that one of the operands is one and thus the other operand in the multiply operation can be sent on the output result bus 160 from the execution unit(s) without having to perform any multiply operation execution. The execution unit(s) therefore can include logic 155 that can handle the common value result signal 151 and perform associated tasks based on the signal 151, such as bypassing execution of the associated operation and sending out a common value signal 153, or sending an operand (received on a bus 140) on output result bus 160. If, however, no results are predicted or determined by the result detection logic 152, then all operands are provided to the execution unit(s) on buses 140 for processing (and the operation 114 is also provided to the execution unit, not shown), the result of which is output on result bus 160.

The common value result on line 153, as well as execution results from execution unit(s) 150 on output result bus 160, can be provided to a pipeline register stage 156 in some embodiments of the invention. Stage 156 includes a number of pipeline registers 158 used in the pipelining operations of the microprocessor. Pipelining is used in many microprocessors to increase instruction throughput by overlapping multiple operations in execution. Using the pipeline registers, a new operation can potentially start executing on each clock cycle; e.g., during each clock cycle, the execution unit(s) can initiate a new instruction and will execute some part of multiple different previously-initiated instructions. The pipeline is divided in stages, where each stage completes a part of an instruction in parallel; the stages are connected to form a pipe. The pipelining of instructions is well known to those of skill in the art. It should be noted that pipeline registers can also be provided in other locations in the architecture 100, such as between the multiplexers 126 and the execution unit(s) 150, and operate similarly to the features of the present invention described below.

Values passed from one pipe stage to the next are stored in pipeline registers 158. An operation is active in one stage of the pipeline at a time, between a pair of the pipeline registers.

The pipeline registers also store control signals and values temporarily between clock cycles. For example, one pipeline stage can store the result for an add operation, another can store the result for a multiply operation, and another can store a result for a divide operation. For example, the pipeline register 158a can store a "result 1" value received on bus 160 from the execution unit(s) 150, resulting from the execution of a first operation by execution unit(s) 150. Similarly, pipeline register 158b can store a "result N" value received on bus 162 from the previous pipeline register and resulting from a previous execution of an operation, and so on. The results are passed to each succeeding pipeline register as new operations provide results. After the final pipeline register 158b, the result value is provided as a write-back result on bus 164.

According to the present invention, the pipeline registers 158 also can store any common value results that were indicated by the result detection logic 152. The common value result provided on line 153 from the execution unit 150 is provided to the pipeline register 158a, thus allowing the common value result to be stored in the pipeline register instead of the result from the execution unit on the full-bit result bus 160 (and no execution was required to obtain that result). Common value results in previous pipeline registers are provided to the next pipeline registers using a one-bit (or other small encoded number of bits) line, such as line 168 that provides the common value result from pipeline register 158a to pipeline register 158b. After the last pipeline register 158b, the common value result is provided on line 170 to the forwarding multiplexer, as explained below. Thus, the present invention saves power by using a smaller amount of lines (bits) to pipeline registers than the full-bit bus would use.

Values going to the pipeline registers 158 are also provided to a forwarding multiplexer 174. Forwarding multiplexer 174 selects one of the values at its inputs to be provided at its output, which is then forwarded toto the multiplexers 126 on bus 132. The result buses 160, 162, and 164 are all connected as separate inputs to the multiplexer 174; also, the common value result lines 153, 168, and 170 of the present invention are also connected as separate inputs to the multiplexer 174.

The selection of the input to multiplexer 174 is provided by the forwarding control 176, which is hardware (and/or software or firmware) that selects an input based on the current pipeline clock cycle, hazard detection, bypass register file access, and/or other well-known factors. In forwarding, a result value is fed back to the execution unit(s) for later processing. The value to be forwarded at the output of the multiplexer 174 is a value from a previously-executed operation. The microprocessor can potentially use this value again in the execution unit(s) 150; if so, the forwarded result is used instead of having to read a value from the register file 102, thus saving processing time. For example, if the forwarding control 176 detects that the previous executed operation has written a pipeline register corresponding to the source for the current operation, control logic (not shown) selects the forwarded result as the execution unit input rather than a value read from the register file 102 on bus 128. Forwarding values is well-known to those of skill in the art.

The selected input value to multiplexer 174 is output on forward result bus 132 if the selected input is one of the buses 160, 162, or 164. The selected value is output on forward common value line 134 if the selected input is one of the common value result lines 153, 168, or 170. The bus 132 and line 134 are connected to the inputs of all the multiplexers 126, and one of these inputs can be selected to be output from a multiplexer 126 by the common value select control 138 as described above. In this way, microprocessor power consumption can be reduced by only using a single bit line 134 instead of the full bus 132, in appropriate cases.

The write-back result bus 164 receives a value from the pipeline registers that will be written back to the register file 102. Similarly, the common value write-back result line 170 indicates that the write-back result is a common value, such as zero or one, and thus indicates to the write logic 106 that only the common value bits need to be written into the register file at area 104 of the register file 102. This bus and line are provided as inputs to the write logic 106, which, as explained above, either writes the value on bus 164 in the register file 102, or writes the value on the common value write-back result line 170 to the common value storage area 104 if line 170 has an appropriate common value signal.

It should be noted that the various common value lines used in the architecture 100 of the present invention, such as lines 113, 116, 122, 129, 142, 151, 166, 168, 170, and 134, can all be considered "encoding buses" that provide the encoded common values to various components of the microprocessor instead of using the full-bit buses, thereby saving power consumption. The encoding buses can be one bit if one common value is detected and encoded, or more bits if multiple common values are detected and encoded.

In architecture 100, an encoding bus (i.e., a one-bit common value line, or lower-bit bus than the full buses) can be provided for each of the buses used in the architecture. Similarly, a one bit (or lower-bit) storage location (such as a flip-flop) can be provided for each of the registers in the register file 102 and all the pipeline registers 158. However, it should also be noted that in other embodiments, only some of the features of the present invention need be implemented; each feature can still independently reduce the consumption of power. For example, one architecture embodiment may only encode the common values onto lower-bit signals used by the register file 102, detection logic 112, and select control 138. Other embodiments may only use common value signals to determine common value results and avoid execution of operations involving common values, as performed by the result detection logic 152 and execution unit(s) 150. Other uses of the common value encoding buses/storage locations, such as for pipeline registers 158 or forwarding control 176, can also be selectively provided or omitted in different embodiments.

FIG. 2 is a flow diagram illustrating a method 200 of the present invention for reducing power consumption for processing of common values in microprocessors. Method 200 can be implemented by a microprocessor architecture, an example of which is shown in FIG. 1 as architecture 100, and by related firmware or code which mimics the functionality of a microprocessor.

For simplicity, the described method focuses on the common value processing of the present invention, and omits references to standard processing of full-bit values as found in typical prior microprocessors, which are well known. Thus, the processing of values on the full-bit buses of the architecture that typically also occur are not described in method 200, as during reads of registers from register file 102, inputs to execution unit(s) 150 on buses 140 and other buses, and transmitting/storing of results on full-bit buses through the pipeline registers 158 and forwarding bus 132. Some of the steps may be performed simultaneously rather than in any particular order shown, as dictated by a particular microprocessor architecture. In addition, not all of the steps need be performed, since some embodiments may not process common values in all the stages of operation processing.

The method begins at 202, and in step 204, common values are encoded and loaded into the common value storage area 104 of the register file 102 by write logic 106 using appropriate operations (full-bit values can of course be loaded into the registers as well, which is not described here). In step 206, the microprocessor architecture 100 receives from another part of the microprocessor an operation 114 which is to be executed. In step 208, the common value detection logic 112 checks for and reads any common values for operands in the operation from the common value storage area 104 and outputs common value signals for these operands on lines 116. In step 210, the read logic 120 receives any bypass signals on lines 122 for common value signals sent on lines 116, and bypasses reading the corresponding operands in registers of the register file 102 on the full-bit bus and provides the encoded common values on appropriate encoding buses, thus saving power consumption of the microprocessor.

In step 212, the common value select control 138 receives the common value signals on lines 116 and selects to output common value signals on encoding buses from operand multiplexers 126 corresponding to the common value operands. In step 214, the result detection logic 152 receives the common value signals from the multiplexers 126 and predicts and determines any common value results based on the common value operands. For example, as explained above, the result of operations such as multiplication including zero or one as an operand can be simply predicted and determined by the result detection logic 152.

In step 216, the result detection logic 152 sends common value result signals to the execution unit(s) 150 to cause the execution unit(s) to bypass the execution of the operation involving the common value. In step 218, the common value result signals are received on an encoding bus and stored by pipeline registers 158, as appropriate. In step 220, the common value result signals are forwarded back to the execution unit(s) for use in another operation, if considered appropriate by the forwarding logic 176. In addition, in step 222, the common value result signals from the pipeline registers are provided as write-back common values to the write logic 106, which writes the common values into the appropriate bit of the common value storage area 104 in the register file 102. The process is then complete at 222. Other operations can be received and processed concurrently or after the processing of the operation as described in method 200.

The present invention uses encoding buses carrying one-bit or low-bit common value signals and flip-flops (or other storage locations) to replace the full-bit bus signals and storage locations that have a larger amount of bits normally used for transmitting and storing the common values. Thus, the present invention avoids the power consumed by driving the value of a common value onto a full-bit bus, by clocking a common value into a full-bit storage location, and/or by performing or executing an operation that is known to produce a result of a common value or an easily-determined result. This can result in a significant amount of power saved during microprocessor operation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing power consumption in a microprocessor, the method comprising:

receiving a microprocessor operation comprising an operand containing a common value;

encoding the common value into an encoded common value, wherein the encoded common value has a smaller number of bits than the corresponding common value; and providing the encoded common value on an encoding bus instead of a full-bit bus in processing of additional received microprocessor operations, wherein the encoding bus is separate from and has a smaller number of bits than the full-bit bus, thereby reducing the power consumption of the microprocessor, wherein using the encoded common value in the microprocessor includes providing results of an operation as a signal on the encoding bus which is provided to a forwarding multiplexer of the microprocessor that forwards execution results to other components of the microprocessor for use in later operations.

2. The method of claim 1 wherein encoding and using the encoded common values in processing includes storing the encoded common values as bit values in a storage area of a register file, wherein each encoded common value has a lower amount of bits than registers that store full-bit values in the register file.

3. The method of claim 2 wherein the encoded common values are one-bit values stored in the storage area of the register file.

4. The method of claim 1 wherein using the encoded common values in processing includes using common value detection logic to retrieve encoded common values associated with operands of a received operation from the storage area of the register file, and to instruct read logic to bypass reading registers associated with the operands.

5. The method of claim 4 wherein the common value detection logic provides signals for encoded common values to a common value select control that selects which of an encoded common value and a full-bit bus value for an operand is provided to an execution unit of the microprocessor.

6. The method of claim 1 wherein using the encoded common values in the microprocessor includes predicting a result of the operation based on at least one encoded common value and bypassing execution of the operation.

7. The method of claim 1 wherein using the encoded common values in the microprocessor includes providing signals on the encoding bus to pipeline registers in the microprocessor without using a full-bit bus coupled to the pipeline registers.

8. The method of claim 1 wherein the common value is a zero value.

9. The method of claim 1 wherein the common value is a one value.

10. The method of claim 1 wherein encoding common values includes encoding a plurality of different types of common values.

11. A microprocessor comprising:

common value detection logic that determines whether an encoded common value is stored in a register file for an operand of an operation to be performed by the microprocessor, the encoded common value having a smaller number of bits than full-bit values stored in registers of the register file, wherein the common value detection logic causes transmission of the encoded common value on an encoding bus instead of a full-bit bus of the microprocessor, wherein the encoding bus is separate from and has a smaller number of bits than the full-bit bus;

read logic coupled to the common value detection logic and receiving a signal from the common value detection logic indicating the encoded common value, the signal indicating to the read logic to bypass reading a register in the register file that corresponds to the common value, thereby reducing power consumption of the microprocessor, and a plurality of multiplexers corresponding to a number of operands in the operation, wherein each multiplexer includes a full bit bus input and an encoding bus input and can select one of its inputs for output to an execution portion of the microprocessor based on a control signal from the common value select control.

12. The microprocessor of claim 11 wherein the encoded common values are stored as bit values, each encoded common value stored as the first one or more bits of its associated register in the register file.

13. The microprocessor of claim 11 further comprising a common value select control coupled to the common value detection logic and receiving the encoded common value from the value detection logic, wherein the common value select control selects which of an encoded common value and a full-bit bus value for an operand is provided to an execution unit of the microprocessor.

14. The microprocessor of claim 11 further comprising result detection logic in the execution portion of the microprocessor that predicts a result of the operation based on at least one received encoding bus signal and outputs a common value result signal to an execution unit indicating the result.

15. The microprocessor of claim 11 further comprising write logic operative to write full-bit values to registers of the register file and operative to write encoded common values to the storage area of the register file.

16. The microprocessor of claim 11 wherein the common value is a zero value.

17. The microprocessor of claim 11 wherein the common value is a one value.

18. A method for reducing power consumption in a microprocessor, the method comprising:

receiving a microprocessor operation comprising an operand containing a common value;

encoding the common value into an encoded common value, wherein the encoded common value has a smaller number of bits than the corresponding common value;

processing additional received operations in the microprocessor using the encoded common value, wherein using the encoded common value in the microprocessor includes providing results of an operation as a signal on the encoding bus which is provided to a forwarding multiplexer of the microprocessor that forwards execution results to other components of the microprocessor for use in later operations, and wherein the processing includes predicting a result of one of the additional received operations based on at least one encoded common value and bypassing execution of the operation as a result, thereby reducing the power consumption of the microprocessor.

19. The method of claim 18 wherein using the encoded common values in processing includes transmitting the encoded common values on lines instead of main buses of the microprocessor, the lines having less bits than the main buses.

20. The method of claim 18 wherein encoding and using the encoded common values in processing includes storing the encoded common values as bit values in a storage area of a register file, wherein each encoded common value has a lower amount of bits than registers that store full-bit values in the register file.

21. The method of claim 18 wherein encoding common values includes encoding a plurality of different types of common values.

22. A microprocessor comprising:

result detection logic that receives an operation to be performed by the microprocessor and receives a signal providing an encoded common value as an operand of the operation, the signal having a smaller number of bits than full-bit buses used for transmitting values in the microprocessor, wherein the result detection logic determines whether it can predict a result of the operation based on the encoded common value, and outputs a common value result signal indicating the result;

a forwarding multiplexer receiving a plurality of inputs, the inputs including at least one full-bit result bus and at least one common value result bus having less bits than the full-bit result bus, wherein a forwarding control logic controls the forwarding multiplexer to select one of the inputs to forward for use in processing a later operation; and at least one execution unit coupled to the result detection logic, and operative to the common value result signal and to bypass execution of the operation based on the common value result signal, thereby allowing a reduction in the consumption of power by the microprocessor.

23. The microprocessor of claim 22 wherein the common value is a zero value, and wherein the result detection logic determines whether it can predict a zero value result of the operation, and outputs the common value result signal indicating the zero value result.

24. The microprocessor of claim 23 wherein the zero value result is predicted when the operation is a multiply operation with the zero value as one of the operands.

25. The microprocessor of claim 23 wherein the zero value result is predicted when the operation is a divide operation with the zero value as the value being divided.

26. The microprocessor of claim 22 wherein the common value is a one value, and wherein the result detection logic determines whether it is a multiply or divide operation including the one value and a second value, and thereby having a result of the second value.

27. The microprocessor of claim 22 further comprising a plurality of pipeline registers, wherein the encoded common value can be provided to the pipeline registers without using a full-bit bus of the microprocessor.

28. The microprocessor of claim 22 wherein the result detection logic or the at least one execution unit provides a write-back common value result which is provided to write logic to be written into a common value storage area of a register file instead of writing a full-bit value into a register of the register file.

* * * * *

UNITED STATES PATENT AND TRADEMARK OFFICE
CERTIFICATE OF CORRECTION

PATENT NO. : 7,631,207 B1 Page 1 of 1
APPLICATION NO. : 11/408784
DATED : December 8, 2009
INVENTOR(S) : Seungyoon Peter Song It is certified that error appears in the above-identified patent and that said Letters Patent is hereby corrected as shown below:

In Claim 22, Column 14 (line 28) please replace "logic, and operative to the common value result signal" to -- logic, and operative to receive the common value result signal --.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,631,207 B1                                             Page 1 of 1
APPLICATION NO. : 11/408784
DATED             : December 8, 2009
INVENTOR(S)       : Song et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Second Day of November, 2010

David J. Kappos
*Director of the United States Patent and Trademark Office*